United States Patent
Gundam et al.

(10) Patent No.: US 7,574,551 B2
(45) Date of Patent: Aug. 11, 2009

(54) OPERATING PCI EXPRESS RESOURCES IN A LOGICALLY PARTITIONED COMPUTING SYSTEM

(75) Inventors: Raghuswamyreddy Gundam, Austin, TX (US); Gregory M. Nordstrom, Pine Island, MN (US); John R. Oberly, III, Rochester, MN (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 11/690,292

(22) Filed: Mar. 23, 2007

(65) Prior Publication Data
US 2008/0235429 A1 Sep. 25, 2008

(51) Int. Cl.
*G06F 11/00* (2006.01)
(52) U.S. Cl. .................................... 710/313; 714/23
(58) Field of Classification Search .................. None
See application file for complete search history.

(56) References Cited

U.S. PATENT DOCUMENTS

| | | | | |
|---|---|---|---|---|
| 5,253,344 | A * | 10/1993 | Bostick et al. | 710/8 |
| 5,784,702 | A * | 7/1998 | Greenstein et al. | 711/173 |
| 6,931,395 | B2 * | 8/2005 | Day et al. | 707/3 |
| 7,293,129 | B2 * | 11/2007 | Johnsen et al. | 710/313 |
| 7,380,046 | B2 * | 5/2008 | Boyd et al. | 710/316 |
| 2005/0060445 | A1 * | 3/2005 | Beukema et al. | 710/52 |
| 2006/0236127 | A1 * | 10/2006 | Kurien et al. | 713/193 |
| 2008/0091855 | A1 * | 4/2008 | Moertl et al. | 710/52 |
| 2008/0126617 | A1 * | 5/2008 | Brownlow et al. | 710/48 |

FOREIGN PATENT DOCUMENTS

WO    WO 2005036358 A2 *    4/2005

OTHER PUBLICATIONS

PCI Express System Architecture Sep. 2003.*

* cited by examiner

*Primary Examiner*—Paul R Myers
(74) *Attorney, Agent, or Firm*—Biggers & Ohanian, LLP

(57) ABSTRACT

Methods, systems, and products are disclosed for operating Peripheral Component Interconnect ('PCI') Express resources in a logically partitioned computing system that include: allocating, by a hypervisor installed on the computing system, a PCI Express adapter installed in the computing system to a logical partition of the computing system, including establishing a data communication path between a processor of the computing system and the PCI Express adapter, the data communication path including a link between a PCI Express root complex and the PCI Express adapter; and administering, by the hypervisor for the logical partition, the PCI Express root complex and the link between the PCI Express root complex and the PCI Express adapter.

6 Claims, 5 Drawing Sheets

OPERATING PCI EXPRESS RESOURCES IN A LOGICALLY PARTITIONED COMPUTING SYSTEM

BACKGROUND OF THE INVENTION

1. Field of the Invention

The field of the invention is data processing, or, more specifically, methods, systems, and products for operating Peripheral Component Interconnect ('PCI') Express resources in a logically partitioned computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is a software tool referred to as a 'hypervisor.' A hypervisor is a layer of system software that runs on the computer hardware beneath the operating system layer to allow multiple operating systems to run on a host computer at the same time. Hypervisors were originally developed in the early 1970's, when company cost reductions were forcing multiple scattered departmental computers to be consolidated into a single, larger computer— the mainframe—that would serve multiple departments. By running multiple operating systems simultaneously, the hypervisor brought a measure of robustness and stability to the system. Even if one operating system crashed, the others would continue working without interruption. Indeed, this even allowed beta or experimental versions of the operating system to be deployed and debugged without jeopardizing the stable main production system and without requiring costly second and third systems for developers to work on.

A hypervisor allows multiple operating systems to run on a host computer at the same time by providing each operating system with its own set of computer resources. These computer resources are typically virtualized counterparts to the physical resources of a computing system. A hypervisor allocates these resources to each operating system using logical partitions. A logical partition is a set of data structures and services that enables distribution of computer resources within a single computer to make the computer function as if it were two or more independent computers. Using a logical partition, therefore, a hypervisor provides a layer of abstraction between a computer hardware layer of a computing system and an operating system layer.

In addition to the software layer, innovations in the computer hardware layer have also occurred in the subsystem that transfers data between components inside a computing system. Older data transfer subsystems included a computer bus that logically connect several components over the same set of wires and transfer data among components in parallel. Older data transfer subsystems included, for example, computer buses implemented according to the Peripheral Component Interconnect ('PCI') or PCI-eXtended ('PCI-X') specifications promulgated by the PCI Special Interest Group ('PCI SIG'). Newer data transfer subsystems include a point-to-point connection between components that serves as a link for transmitting data serially. One implementation of such a data transfer subsystem includes a data transfer subsystem implemented according to the set of PCI Express ('PCIe') specifications promulgated by the PCI Special Interest Group ('PCI SIG').

A PCI Express data transfer subsystem uses existing PCI programming and software concepts, but is based on a different and much faster serial physical-layer communications protocol. The physical-layer consists not of a bus, but of a network of serial interconnections extending to each PCI Express adapter from a PCI Express root complex. The PCI Express root complex is a computer hardware chipset that handles communications between the components of a computer system such as, for example, a computer processor, RAM, non-volatile memory, power management components, the real-time system clock, PCI Express adapters, and so on. The PCI Express root complex includes a host bridge for communicating with one or more computer processors. The PCI Express root complex also includes a number of ports that each provides data communication with a port on a PCI Express device such as, for example, a PCI Express switch or PCI Express adapter.

A connection between any two PCI Express ports is referred to as a 'link.' A link consists of a collection of one or more lanes used for data communications between PCI Express devices. Each lane is a set of two unidirectional low voltage differential signaling pairs of transmission pathways such as, for example, traces along a motherboard. Because transmitting data and receiving data are implemented using separate differential pairs, each lane allows for full-duplex serial data communication of up to five gigabits of data per second with the potential for increased bandwidth as technology in the physical layer advances. The ability to combine several lanes together to form a link allows PCI Express technology to provide scalable bandwidth.

The increased performance offered by computing systems designed using PCI Express technology is readily apparent given the scalable, high-bandwidth capability afforded by PCI Express. As PCI Express becomes the data transfer subsystem implementation preferred by computer architects, more and more computing systems will take advantage of the increased performance offered by PCI Express, including logically partition computing systems. Readers will therefore appreciate that there is an ongoing need for improvement in the area of operating PCI Express resources in a logically partitioned computing system.

SUMMARY OF THE INVENTION

Methods, systems, and products are disclosed for operating Peripheral Component Interconnect ('PCI') Express resources in a logically partitioned computing system that include: allocating, by a hypervisor installed on the computing system, a PCI Express adapter installed in the computing system to a logical partition of the computing system, including establishing a data communication path between a processor of the computing system and the PCI Express adapter, the data communication path including a link between a PCI Express root complex and the PCI Express adapter; and administering, by the hypervisor for the logical partition, the PCI Express root complex and the link between the PCI Express root complex and the PCI Express adapter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
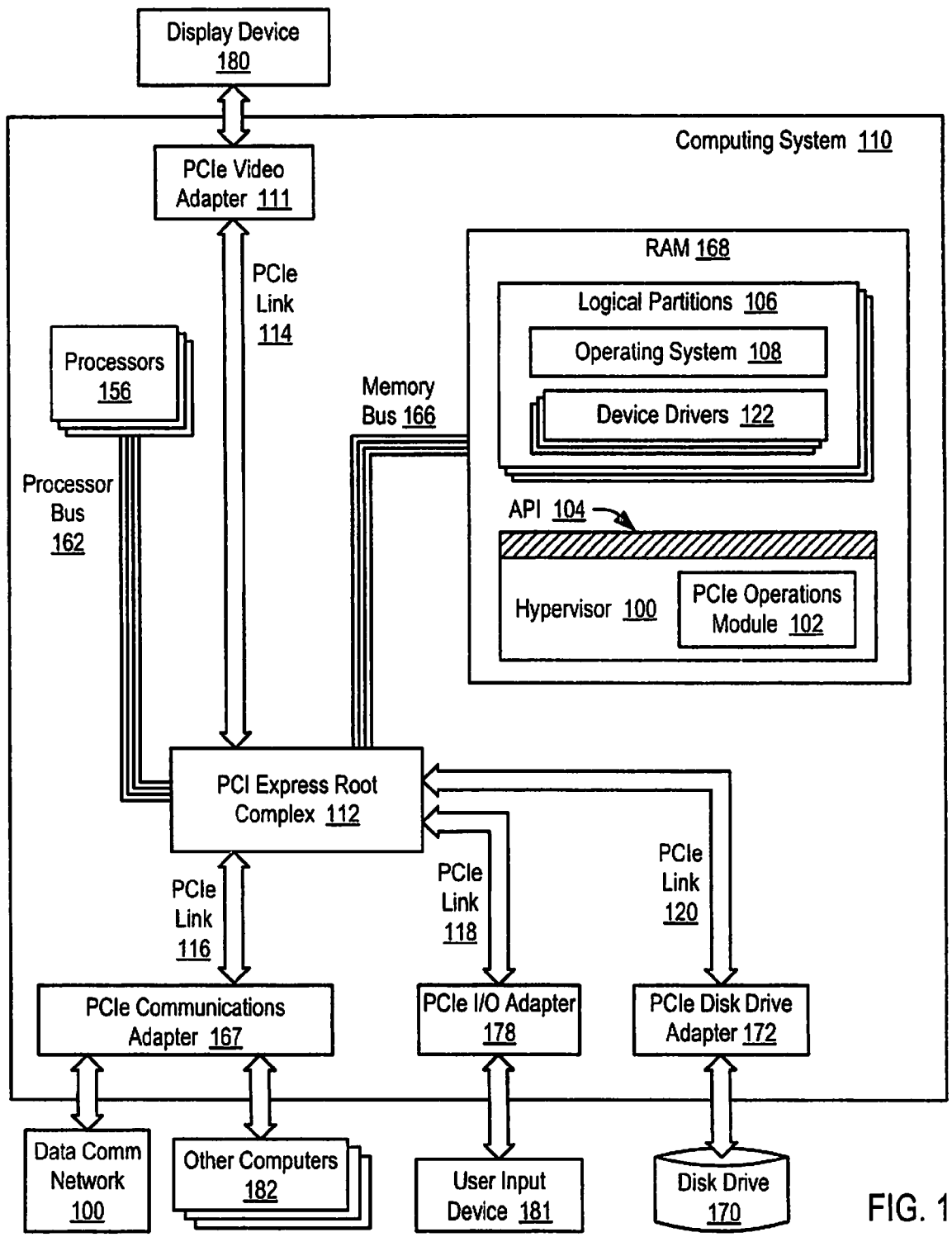
FIG. 1 sets forth a block diagram of automated computing machinery comprising an example of a computer useful in operating Peripheral Component Interconnect Express resources in a logically partitioned computing system according to embodiments of the present invention.

Exemplary methods, apparatus, and products for operating PCI Express resources in a logically partitioned computing system according to embodiments of the present invention are described with reference to the accompanying drawings, beginning with FIG. 1. FIG. 1 sets forth a block diagram of automated computing machinery comprising an exemplary computing system (110) for operating PCI Express resources in a logically partitioned computing system. PCI Express resources generally refer to any adapter, switch, link, root complex, or other structure or component operating according to the set of PCI Express specifications promulgated by the PCI SIG. The exemplary computing system (110) of FIG. 1 operates PCI Express resources in a logically partitioned computing system according to embodiments of the present invention as follows: A hypervisor (100) installed on the computing system (110) allocates a PCI Express adapter installed in the computing system (110) to a logical partition (106) of the computing system (110), which includes establishing a data communication path between a processor (156) of the computing system (110) and the PCI Express adapter. The data communication path includes a link between a PCI Express root complex (112) and the PCI Express adapter. The hypervisor (100) administers, for the logical partition (106), the PCI Express root complex (112) and the link between the PCI Express root complex (112) and the PCI Express adapter (204). A PCI Express adapter is an adapter operating according to the set of PCI Express specifications.

The exemplary computing system (110) of FIG. 1 includes computer processors (156) or 'CPUs' as well as random access memory (168) ('RAM'). The RAM (168) is connected through a high speed memory bus (166) and a PCI Express root complex (112) to processors (156) and to other components of the exemplary computing system. Stored in RAM (168) are logical partitions (106) and a hypervisor (100). Each logical partition (106) provides an execution environment for various applications and an operating system (108). An application is a set of computer program instructions implementing user-level data processing.

The operating system (108) of FIG. 1 is system software that manages the resources allocated to the logical partition (106) by the hypervisor (100). The operating system (108) performs basic tasks such as, for example, controlling and allocating virtual memory, prioritizing the processing of instructions, controlling virtualized input and output devices, facilitating networking, managing a virtualized file system, and so on. Operating systems useful in computers according to embodiments of the present invention include UNIX™, Linux™, Microsoft NT™, IBM's AIX™, IBM's i5/OS™, and others as will occur to those of skill in the art.

In the example of FIG. 1, the operating system (108) utilizes several device drivers (122) to interact with the various PCI Express adapters installed in the computing system (110). A device driver is computer software that provides interaction with a hardware device to an operating system or other application software. Because of the specialized role of a device driver, device drivers are often hardware-dependent and operating system-dependent.

The hypervisor (100) of FIG. 1 is a layer of system software that runs on the computer hardware beneath the operating system layer to allow multiple operating systems to run on a host computer at the same time. The hypervisor (100) provides each operating system with a set of computer resources using the logical partitions. For example, the hypervisor (100) provides processor resources to each partition by scheduling processor execution time on one or more processors to the operating system in each logical partition. A logical partition is a set of data structures and services provided to a single operating system that enables the operating system to run concurrently with other operating systems on the same computer hardware. In effect, the logical partitions allow the distribution of computer resources within a single computer to make the computer function as if it were two or more independent computers.

Although not specifically depicted in FIG. 1, the hypervisor (100) of FIG. 1 is generally composed of a dispatchable portion and a non-dispatchable portion. The dispatchable portion of the hypervisor (100) generally operates as a hidden partition that executes in a manner similar to a logical partition. The dispatchable hypervisor, however, differs from other logical partitions in that it is a private, hidden partition that does not generally support user-level applications and has special authorization to control hardware resources. In addition, the dispatchable hypervisor has its own private interface for communicating to the non-dispatchable hypervisor that is not available to the logical partitions (106). The non-dispatchable portion of the hypervisor (100) is a supervisory agent that is non-dispatchable and non-relocatable because the non-dispatchable hypervisor functions by accessing the physical address space. The non-dispatchable hypervisor provides privileged mode processor functions that may be invoked by the dispatchable hypervisor, hardware interrupts, and calls from the logical partition (106) to the hypervisor application programming interface ('API') (104).

Together the dispatchable and the non-dispatchable portions of the hypervisor (100) in FIG. 1 enforce logical partitioning between one or more operating systems by storing state values in various hardware registers and other structures, which define the boundaries and behavior of the logical partitions (106). Using such state data, the hypervisor (100) may allocate memory to logical partitions, route input/output between input/output devices and associated logical partitions, provide processor-related services to logical partition, and so on. Essentially, this state data defines the allocation of resources in logical partitions, and the allocation is altered by changes the state data rather than by physical reconfiguration of hardware.

In the example of FIG. 1, the hypervisor (100) includes a PCI Express operations module (102). The PCI Express operations module (102) of FIG. 1 is a set of computer program instructions for operating PCI Express resources in a logically partitioned computing system according to embodiments of the present invention. The PCI Express operations module (102) generally operates PCI Express resources in a logically partitioned computing system according to embodiments of the present invention by: allocating a PCI Express adapter installed in the computing system to a logical partition (106) of the computing system, including establishing a data communication path between a processor (156) of the computing system and the PCI Express adapter, the data communication path including a link between a PCI Express root complex (112) and the PCI Express adapter; and administering, for the logical partition (106), the PCI Express root complex (112) and the link between the PCI Express root complex (112) and the PCI Express adapter.

In some circumstances, the operating system (108) or device drivers (122) may find it useful to reset or re-synchronize the adapter by changing the state of the PCI Express link such as, for example, retraining or resetting the link. To relieve the operating system (108) and the device drivers (122) from administering transitions of the PCI express root complex and link hardware between "running" and "error-stopped" states, the PCI Express operations module presents abstracted runtime and abstracted error stopped states to the operating system (108) and device drivers (122). The operating systems, as a virtue of the methods and apparatus of the present invention, need observe only the "running" and "error-stopped" states of the PCI Express root complex and PCI Express link to the adapter, instead of managing the actual configuration of the PCI express root complex and link hardware.

The PCI Express operations module (102) may administer the PCI Express root complex (112) and the link between the PCI Express root complex (112) and the PCI Express adapter by: receiving a service request from a device driver (122) operating in the logical partition (106) for the PCI Express adapter, the service request specifying an operation that retrains the link; performing the operation specified in the service request, including retraining the link; and suppressing, to prevent the PCI Express root complex (112) from placing the PCI Express adapter in a stopped state, a root complex error that results from retraining the link. The PCI Express operations module (102) may also administer the PCI Express root complex (112) and the link between the PCI Express root complex (112) and the PCI Express adapter by: detecting an error in the PCI Express root complex (112) for the PCI Express root complex (112), the PCI Express adapter, or the link, the error causing the PCI Express root complex (112) to place the PCI Express adapter in a stopped state; determining whether the error is severe; clearing the error in the PCI Express root complex (112) if the error is not severe; resetting the PCI Express root complex (112) if the error is severe; performing a hot reset of the link if the error is severe, the hot reset maintaining data in sticky registers of the PCI Express adapter; and recovering the PCI Express adapter from the stopped state in response to adapter recovery requests from a device driver (122) operating in the logical partition (106) for the PCI Express adapter.

Although the hypervisor (100), the operating system (154), the device driver (122), and the logical partitions (106) in the example of FIG. 1 is shown in RAM (168), readers will note that many portions of these components typically are also stored in non-volatile memory. For example, the hypervisor (100) is typically implemented in firmware and shadowed in RAM (168) to increase system performance, and the operating system (154), the device driver (122), and the logical partitions (106) may be stored in whole or in part on, for example, a disk drive (170).

The exemplary computing system (110) of FIG. 1 also includes a PCI Express root complex (112). The PCI Express root complex (112) is a computer hardware chipset that handles communications between the components of a computing system such as, for example, a computer processors (156), RAM (168), non-volatile memory, power management components, the real-time system clock, PCI Express adapters, and so on. The PCI Express root complex (112) of FIG. 1 includes a host bridge for communicating with computer processors (156) through processor bus (162). The PCI Express root complex (112) also includes a number of ports that each provides data communication with a port on a PCI Express device such as, for example, a PCI Express switch or PCI Express adapter.

In the example of FIG. 1, the PCI Express root complex (112) connects to various PCI Express adapters through PCI Express links, or simply 'links.' A link establishes a data communications path between a port of the PCI Express root complex (112) and a port of one of the PCI Express adapters. A link consists of a collection of one or more lanes used for data communications between PCI Express devices. Each lane is a set of two unidirectional low voltage differential signaling pairs of transmission pathways such as, for example, traces along a motherboard. As mentioned above, each lane allows for full-duplex serial data communication of up to five gigabits of data per second with the potential for increased bandwidth as technology in the physical layer advances. The ability to combine several lanes together to form a link allows PCI Express technology to provide scalable bandwidth. Current PCI Express specifications allow for links composed of one lane, two lanes, four lanes, eight lanes, sixteen lanes, and thirty-two lanes.

The exemplary computer (110) of FIG. 1 also includes PCI Express disk drive adapter (172) coupled through the link (120) with the PCI Express root complex (112) to processors (156) and other components of the exemplary computer (110). Disk drive adapter (172) connects non-volatile data storage to the exemplary computer (110) in the form of disk drive (170). Other non-volatile data storage may be implemented for a computer as an optical disk drive, electrically erasable programmable read-only memory (so-called 'EEPROM' or 'Flash' memory), RAM drives, and so on, as will occur to those of skill in the art.

The exemplary computer (110) of FIG. 1 includes one or more PCI Express input/output ('I/O') adapters (178) coupled through link (118) with the PCI Express root complex (112) to processors (156) and other components of the exemplary computer (110). PCI Express I/O adapters in computers implement user-oriented input/output through, for example, software drivers and computer hardware for controlling output to display devices such as computer display screens, as well as user input from user input devices (181) such as keyboards and mice. The exemplary computer (110) of FIG. 1 includes a PCI Express video adapter (111), which is an example of an I/O adapter specially designed for graphic output to a display device (180) such as a display screen or computer monitor. The PCI Express video adapter (111) is connected to processors (156) and other components of the exemplary computer (110) through link (114) with the PCI Express root complex (112).

The exemplary computer (110) of FIG. 1 includes a PCI Express communications adapter (167) coupled through link (116) with the PCI Express root complex (112) to processors (156) and other components of the exemplary computer (110). The PCI Express communications adapter (167) provides data communications with other computers (182) and provides data communications through data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in the present invention include modems for wired dial-up communications, IEEE 802.3 Ethernet adapters for wired data communications network communications, and IEEE 802.11b adapters for wireless data communications network communications.

Figure 2:
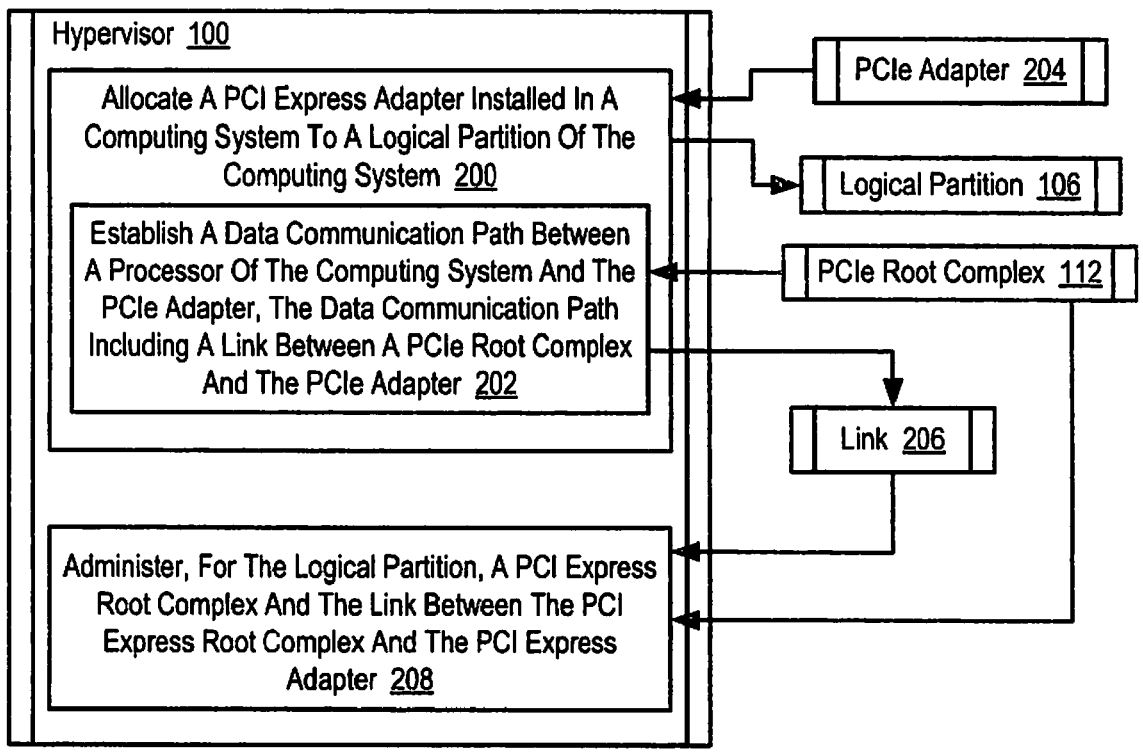
FIG. 2 sets forth a flow chart illustrating an exemplary method for operating Peripheral Component Interconnect Express resources in a logically partitioned computing system according to embodiments of the present invention.

For further explanation, FIG. 2 sets forth a flow chart illustrating an exemplary method for operating Peripheral Component Interconnect Express resources in a logically partitioned computing system according to embodiments of the present invention. The method of FIG. 2 includes allocating (200), by a hypervisor (100) installed on a computing system, a PCI Express adapter installed in the computing system to a logical partition (106) of the computing system. As mentioned above, a logical partition (106) is a set of data structures and services provided by the hypervisor (100) to the operating system layer that enables the operating system to run concurrently with other operating systems on the same computer hardware. The logical partition (106) allows the hypervisor (100) to simulate hardware in the hardware layer to system software in the operating system layer.

Allocating (200), by a hypervisor (100) installed on a computing system, a PCI Express adapter (204) installed in the computing system to a logical partition (106) of the computing system according to the method of FIG. 2 may be carried out by establishing data structures for the logical partition (106) that represent an adapter (204) operating according to the set of PCI Express specifications that is installed in the computing system. The hypervisor (100) provides data structures representing the PCI Express adapter (204) to the logical partition (106) to effect communication between the logical partition (106) and the PCI Express adapter (204). As the hypervisor (100) reads or writes values to the data structure representing the PCI Express adapter (204) on behalf of a device driver operating in the logical partition (106), corresponding values are read or written to registers in the PCI Express adapter (204). The data structures in the logical partition (106) representing the PCI Express adapter (204) in the example of FIG. 2 may be used by the hypervisor (100) to assign portions of a computer processor's memory space to the PCI Express adapter for memory-map input/output, to assign virtualized interrupts to the device driver, and so on.

In the example of FIG. 2, allocating (200), by a hypervisor (100) installed on a computing system, a PCI Express adapter (204) installed in the computing system to a logical partition (106) of the computing system includes establishing (202) a data communication path between a processor of the computing system and the PCI Express adapter (204). The data communications path is a channel of communications between the processor and the PCI Express adapter that includes a link (206) between a PCI Express root complex (112) and the PCI Express adapter (204). In the example of FIG. 2, the link (206) represents the link between the PCI Express root complex (112) and the PCI Express adapter (204). Similar to the PCI Express adapter data structure, the hypervisor (100) may create data structures representing PCI Express root complex (112) and the link (206) that maintains state information about the root complex (112) the link (206) between the PCI Express root complex (112) and the PCI Express adapter (206). As the hypervisor (100) detects changes in the state of the root complex (112) or the link (206), the hypervisor updates the corresponding values in the data structure representing the root complex (112) and the link (206).

In the method of FIG. 2, the hypervisor (100) may establish (202) a data communication path between a processor of the computing system and the PCI Express adapter (204) by initializing and synchronizing the PCI Express root complex (112) and the link (206) to a runtime state. The hypervisor (100) may initialize and synchronize the PCI Express root complex (112) and the link (206) to a runtime state by setting values in the data structures of the hypervisor that represent the link (206) and a root complex (112). These data structure may include methods that, in turn, modify values in the hardware which these data structures represent. After establishing (202) a data communication path between a processor of the computing system and the PCI Express adapter (204), the hypervisor (100) may further allocate (200) a PCI Express adapter (204) installed in the computing system to a logical partition (106) of the computing system according to the method of FIG. 2 by scheduling processor execution time to the device driver operating in the logical partition (106) to allow the device driver to instruct the processor to communicate with the PCI Express adapter (204).

The method of FIG. 2 also includes administering (208), by the hypervisor (100) for the logical partition (106), the PCI Express root complex (112) and the link (206) between the PCI Express root complex (112) and the PCI Express adapter (204). The hypervisor (100) may administer (208) the PCI Express root complex and the link (206) for the logical partition (106) according to the method of FIG. 2 by: receiving a service request from a device driver operating in the logical partition (106) for the PCI Express adapter (204), the service request specifying an operation that retrains the link (206); performing the operation specified in the service request, including retraining the link (206); and suppressing a root complex error that results from retraining the link (206) to prevent the PCI Express root complex (112) from placing the PCI Express adapter (204) in a stopped state as discussed in more detail below with reference to FIG. 3. The hypervisor (100) may administer (208) the PCI Express root complex (112) and the link (206) for the logical partition (106) according to the method of FIG. 2 by: detecting an error in the PCI Express root complex (112) for the PCI Express root complex (112), the PCI Express adapter (204), or the link (206), the error causing the PCI Express root complex (112) to place the PCI Express adapter (204) in a stopped state; determining whether the error is severe; clearing the error in the PCI Express root complex (112) if the error is not severe; resetting the PCI Express root complex (112) if the error is severe; performing a hot reset of the link (206) if the error is severe, the hot reset maintaining data in sticky registers of the PCI Express adapter (204); and recovering the PCI Express adapter (204) from the stopped state in response to adapter recovery requests from a device driver operating in the logical partition (106) for the PCI Express adapter (204) as discussed in more detail below with reference to FIG. 4.

As mentioned above, a hypervisor may administer the PCI Express root complex and the link between the root complex and the adapter by suppressing a root complex error that results from retraining the link to prevent the PCI Express root complex from placing the PCI Express adapter in a stopped state. For further explanation, therefore, FIG. 3 sets forth a flow chart illustrating a further exemplary method for operating Peripheral Component Interconnect Express resources in a logically partitioned computing system according to embodiments of the present invention that includes suppressing (318) a root complex error (316) that results from retraining the link (206) to prevent the PCI Express root complex (112) from placing the PCI Express adapter (204) in a stopped state.

Figure 3:
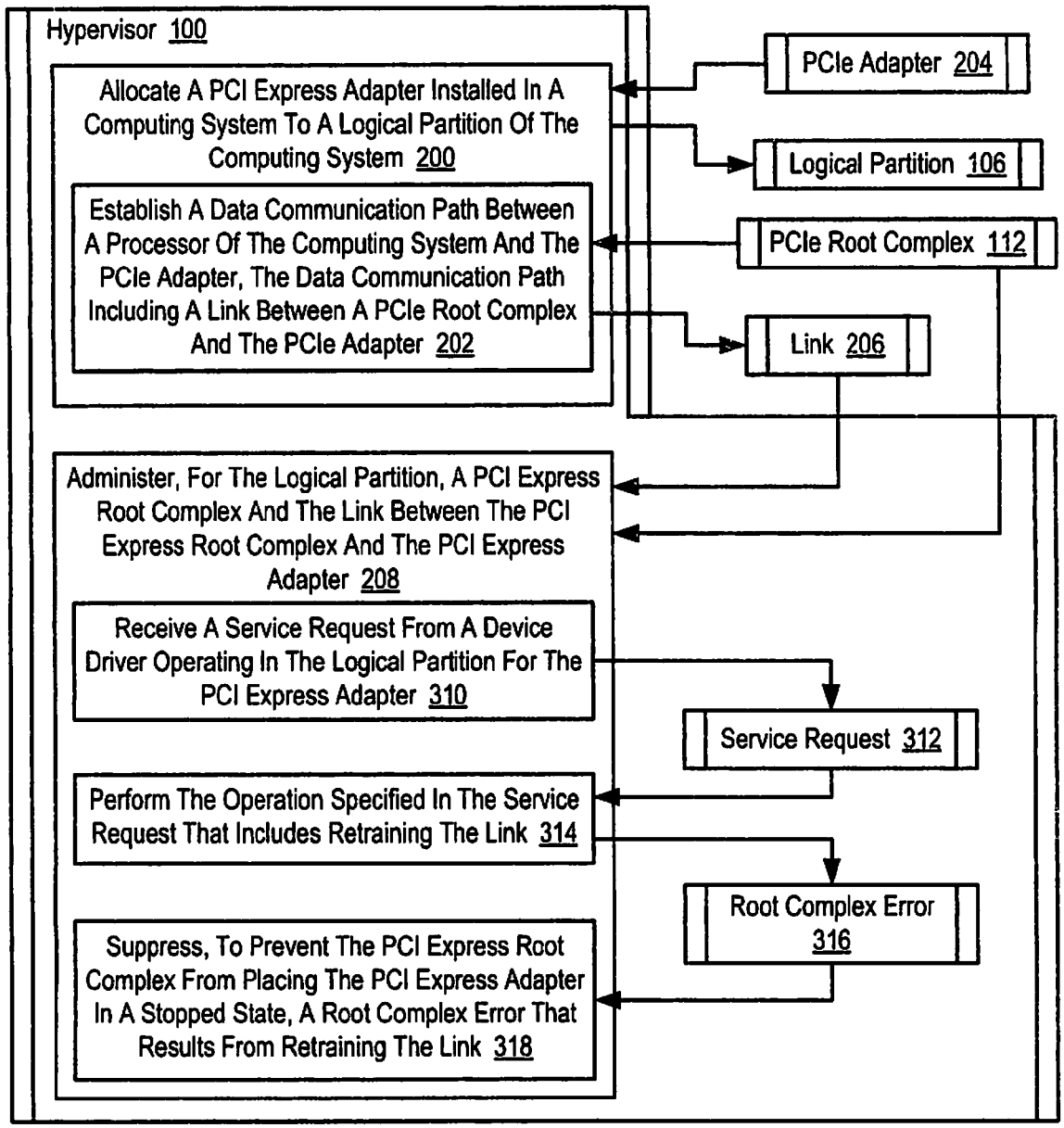
FIG. 3 sets forth a flow chart illustrating a further exemplary method for operating Peripheral Component Interconnect Express resources in a logically partitioned computing system according to embodiments of the present invention.

The method of FIG. 3 is similar to the method of FIG. 2. That is, the method of FIG. 3 includes allocating (200), by a hypervisor (100) installed on the computing system, a PCI Express adapter (204) installed in the computing system to a logical partition (106) of the computing system, including establishing (202) a data communication path between a processor of the computing system and the PCI Express adapter (204). The data communication path includes a link (206) between a PCI Express root complex (112) and the PCI Express adapter (204). The method of FIG. 3 is also similar to the method of FIG. 2 in that the method of FIG. 3 includes administering (208), by the hypervisor (100) for the logical partition (106), the PCI Express root complex and the link (206) between the PCI Express root complex (112) and the PCI Express adapter (204).

Administering (208) the PCI Express root complex and the link (206) according to the method of FIG. 3 includes receiving (310), by the hypervisor (100), a service request (312) from a device driver operating in the logical partition (106) for the PCI Express adapter (204). The service request (312) of FIG. 3 represents an instruction from the device driver to the hypervisor (100) to perform a particular operation. In the example of FIG. 3, the service request (312) specifies an operation that retrains the link (206) between the PCI Express root complex (112) and the PCI Express adapter (204). Such a service request may include, for example, a request to reset the PCI Express adapter. Link retraining is a process specified by the PCI Express specification that involves link width and data rate negotiation, locking bits and symbols for each lane in the link, establishing lane polarity, ordering the lanes within the link, and so on. The hypervisor (100) may receive (310) a service request (312) from a device driver operating in the logical partition (106) for the PCI Express adapter (204) according to the method of FIG. 3 as a call by the device driver into the hypervisor (100) through an API exposed by the hypervisor to the logical partition (106).

Administering (208) the PCI Express root complex and the link (206) according to the method of FIG. 3 also includes performing (314), by the hypervisor (100), the operation specified in the service request (312), including retraining the link (206). The hypervisor (100) may perform (314) the operation specified in the service request (312), which includes retraining the link (206), according to the method of FIG. 3 by allocating processor execution time to the hypervisor to perform the requested operations. The hypervisor (100) may retrain the link (206) according to the method of FIG. 3 by setting bit five of the link control register of the PCI Express capability structure for a PCI Express device to a value of '1' according to the PCI Express specification.

Administering (208) the PCI Express root complex and the link (206) according to the method of FIG. 3 includes suppressing (318), by the hypervisor (100) to prevent the PCI Express root complex from placing the PCI Express adapter (204) in a stopped state, a root complex error (316) that results from retraining the link (206). A stopped state for a PCI Express adapter is a state configured in the PCI Express root complex for the adapter such that all processor reads from the adapter result in a return value that signifies a possible error state, such as for example 'FFFFFFFF,' all processor stores to the adapter are discarded, and any communications originating from the adapter are aborted. A stopped state for a PCI Express adapter, therefore, effectively freezes memory-mapped I/O and direct memory access communications.

In the example of FIG. 3, a root complex error (316) represents an error in the PCI Express root complex, which results from retraining the link (206). Retraining the link (206) produces a root complex error (316) because the root complex (112) is typically configured to enter an error state and activate an interrupt when the link is retrained. Additional errors are produced in the root complex (112) when communication with the PCI Express adapter is attempted while the link retraining occurs. Upon detecting a root complex error (316), the PCI Express root complex (112) may attempt to place the PCI Express adapter in the stopped state. The hypervisor (100) may suppress (318) the root complex error (316) to prevent the PCI Express root complex (112) from placing the PCI Express adapter (204) in a stopped state according to the method of FIG. 3 by masking the root complex error (316) and suppressing root complex interrupts. Suppressing (318) the root complex error (316) to prevent the PCI Express root complex from placing the PCI Express adapter (204) in a stopped state according to the method of FIG. 3 advantageously maintains synchronization between the device driver and the PCI Express adapter without the device driver having to be aware of the state of the link. For example, if the device driver issues a service request to the hypervisor to reset the PCI Express adapter, the device driver is expecting to communicate with the adapter upon reset, not recover the adapter from a stopped state that resulted from the link retraining that also occurs when the adapter is reset.

As mentioned above, a hypervisor may administer the PCI Express root complex and the link between the root complex and the adapter by recovering the PCI Express adapter from a stopped state in response to adapter recovery requests from a device driver operating in the logical partition for the PCI Express adapter. For further explanation, FIG. 4 sets forth a flow chart illustrating a further exemplary method for operating Peripheral Component Interconnect Express resources in a logically partitioned computing system according to embodiments of the present invention that includes recovering (414), by the hypervisor (100), the PCI Express adapter (204) from a stopped state in response to adapter recovery requests from a device driver operating in the logical partition (106) for the PCI Express adapter (204).

Figure 4:
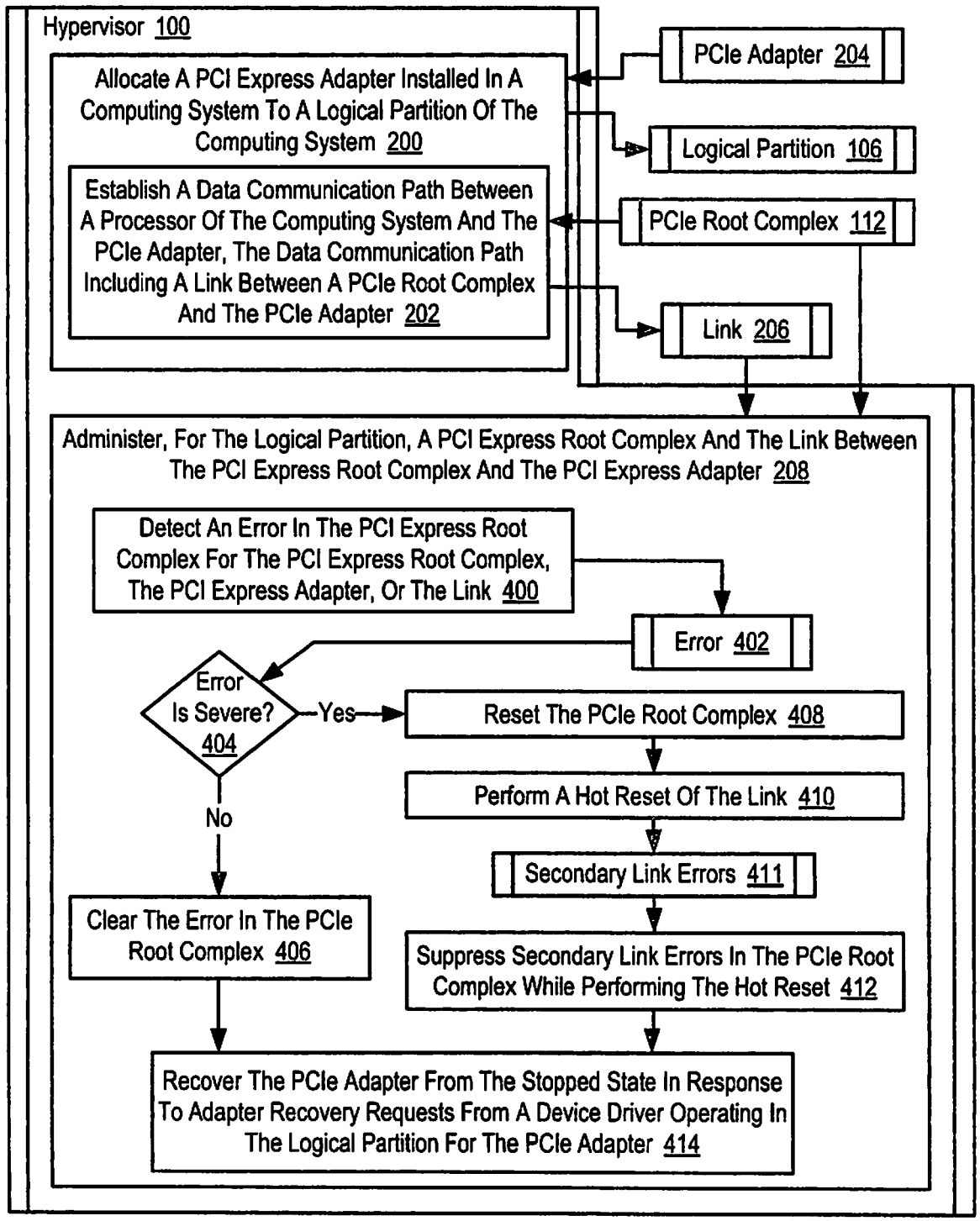
FIG. 4 sets forth a flow chart illustrating a further exemplary method for operating Peripheral Component Interconnect Express resources in a logically partitioned computing system according to embodiments of the present invention.

The method of FIG. 4 is similar to the method of FIG. 2. That is, the method of FIG. 4 includes allocating (200), by a hypervisor (100) installed on the computing system, a PCI Express adapter (204) installed in the computing system to a logical partition (106) of the computing system, including establishing (202) a data communication path between a processor of the computing system and the PCI Express adapter (204). The data communication path includes a link (206) between a PCI Express root complex (112) and the PCI Express adapter (204). The method of FIG. 4 is also similar to the method of FIG. 2 in that the method of FIG. 4 includes administering (208), by the hypervisor (100) for the logical partition (106), the PCI Express root complex and the link (206) between the PCI Express root complex (112) and the PCI Express adapter (204).

Administering (208), by the hypervisor (100) for the logical partition (106), the PCI Express root complex and the link (206) according to the method of FIG. 4 includes detecting (400), by the hypervisor (100), an error (402) in the PCI Express root complex for the PCI Express root complex, the PCI Express adapter, or the link. The error (402) of FIG. 4 represents value in a register of the PCI Express root complex that is set when the PCI Express root complex, the PCI Express adapter, or the link generate an error such as, for example, a surprise down link error. The hypervisor (100) may detect (400) an error (402) for the PCI Express root complex, the PCI Express adapter, or the link according to the method of FIG. 4 by receiving an interrupt from the root complex indicating that an error as occurred and discovering the particular type of error by reading the error registers of the PCI Express root complex. The hypervisor (100) may also detect (400) an error (402) for the PCI Express root complex (112), the PCI express adapter (204), or the link (206) according to the method of FIG. 4 by initiating a processor read from the registers for the PCI Express root complex (112) or PCI Express link (206), independent of and asynchronous to an interrupt signaling an error (402). The hypervisor (100) may make these processor reads from the registers for the PCI Express root complex (112) or PCI Express link (206) in response to a request from an operating system or a device driver of the logical partition (106) after the operating system or the device driver receives an error response value to a processor read from the adapter (204).

In the example of FIG. 4, the error (402) for the PCI Express root complex, the PCI Express adapter, or the link causes the PCI Express root complex to place the PCI Express adapter (204) in a stopped state without resetting the root complex or the link. Placing the PCI Express adapter (204) in a stopped state when the error (402) for the PCI Express root complex, the PCI Express adapter, or the link occurs advantageously allows the present invention to encapsulate new error states defined according to the PCI Express specification that were not previously defined in the PCI or PCI-X specification into a single stopped state that the hypervisor provides to the device driver while the hypervisor administers the root complex and the link. In such a manner, the device driver does not need to be aware of the PCI Express root complex and PCI Express links and how to manage them in order to interface with the PCI Express adapter. Because device drivers designed according to the PCI or PCI-X specification did not have access to state and error information regarding the root complex and links, these device drivers may still be utilized in some embodiments of the present invention.

In the method of FIG. 4, administering (208), by the hypervisor (100) for the logical partition (106), the PCI Express root complex and the link (206) also includes determining (404), by the hypervisor (100), whether the error (402) is severe. The hypervisor (100) may determine (404) whether the error (402) is severe according to the method of FIG. 4 by identifying whether the error is signaled with a ERR_COR, ERR_NONFATAL, or ERR_FATAL message. The ERR_COR message is issued when the component or device detects a correctable error on the PCI Express interface and may indicate that the error (402) is not severe. The ERR_NONFATAL message is issued when the component or device detects a Non-fatal, uncorrectable error on the PCI Express interface and may indicate that the error (402) is severe. The ERR_FATAL message is issued when the component or device detects a Fatal, uncorrectable error on the PCI Express interface and may indicate that the error (402) is severe.

Administering (208), by the hypervisor (100) for the logical partition (106), the PCI Express root complex and the link (206) according to the method of FIG. 4 includes clearing (406), by the hypervisor (100), the error (402) in the PCI Express root complex (112) if the error (402) is not severe. The hypervisor (100) may clear (406) the error (402) in the PCI Express root complex according to the method of FIG. 4 by resetting any interrupts and error registers in the root complex (112) so that these resources are ready to trap the next error. When the hypervisor (100) clears (406) the error (402) in the PCI Express root complex because the error (402) is not severe, the hypervisor (100) does not reset the root complex or perform a hot reset of the link (206).

In the method of FIG. 4, administering (208), by the hypervisor (100) for the logical partition (106), the PCI Express root complex and the link (206) includes resetting (408), by the hypervisor (100), the PCI Express root complex (112) if the error (402) is severe. The hypervisor (100) may reset (408) the PCI Express root complex according to the method of FIG. 4 by restoring values in the registers of the PCI Express root complex to their initial state after power to the root complex is cycled and setting values in a root complex data structure representing the root complex in the hypervisor to indicate that the root complex is being reset. Upon completion of the reset operation, the hypervisor may set values in a root complex data structure representing the root complex in the hypervisor to indicate that the root complex is operational.

In the method of FIG. 4, administering (208), by the hypervisor (100) for the logical partition (106), the PCI Express root complex and the link (206) includes performing (410), by the hypervisor (100), a hot reset of the link (206) if the error (402) is severe. A hot reset is a protocol reset that propagated in-band across a link using a physical layer mechanism. The hot reset maintains data in sticky registers of the PCI Express adapter (204). A sticky register is a register that is not initialized or modified by hot reset according to the PCI Express specification. The registers of the PCI Express adapter (204) may be defined as 'sticky' using the attributes ROS, RWS, or RW1CS as described in the PCI Express Specification. The hypervisor (100) may perform (410) a hot reset of the link (206) by instructing the PCI Express complex to transmit across the link (206) two consecutive training sequence ordered sets with the hot reset bit of the training control field asserted to cause the link (206) to enter the hot reset state. The hypervisor (100) may further perform (410) a hot reset of the link (206) by setting values in a link data structure representing the link in the hypervisor to indicate that the link is in the hot reset state. Upon completion of the hot reset, the hypervisor may set values in a link data structure representing the link in the hypervisor to indicate that the hot reset of the link has completed. Performing (410), by the hypervisor (100), a hot reset of the link (206) according to the method of FIG. 4 advantageously maintains the state of the PCI Express adapter expected by the device driver. This adapter state would be lost if a fundamental reset were performed.

In the method of FIG. 4, administering (208), by the hypervisor (100) for the logical partition (106), the PCI Express root complex and the link (206) also includes suppressing (412), by the hypervisor (100), secondary link errors (411) in the PCI Express root complex while performing (410) the hot reset of the link. The secondary link errors (411) represent errors that result from the hot reset of the link (206). Such secondary link errors (411) may occur, for example, if the adapter attempts input/output operations while the link (206) is being reset. The hypervisor (100) may suppress (412) the secondary link errors (411) in the PCI Express root complex according to the method of FIG. 4 by masking the secondary link errors (411) and suppressing any interrupts generated because of the secondary link errors. Suppressing (412), by the hypervisor (100), secondary link errors (411) in the PCI Express root complex while performing (410) the hot reset of the link according to the method of FIG. 4 advantageously prevents generation of additional errors and interrupts that the hypervisor expects to occur due to the hot reset of the link.

Administering (208), by the hypervisor (100) for the logical partition (106), the PCI Express root complex and the link (206) according to the method of FIG. 4 includes recovering (414), by the hypervisor (100), the PCI Express adapter (204) from the stopped state in response to adapter recovery requests from a device driver operating in the logical partition (106) for the PCI Express adapter (204). The adapter recovery requests are instructions from the device driver to the hypervisor to recover the adapter from the stopped state. The adapter recovery requests may be issued by the device driver to the hypervisor using function calls of an API (reference numeral 104 of FIG. 1) provided by the hypervisor. As mentioned above, a stopped state for a PCI Express adapter effectively freezes memory-mapped input/output and direct memory access communications. The hypervisor (100) may recover (414) the PCI Express adapter (204) from the stopped state in response to adapter recovery requests from a device driver according to the method of FIG. 4 by attempting to unfreeze the memory-mapped input/output so that the processor may access the adapter registers and allowing the device driver to determine whether the adapter status requires a fundamental reset or hot reset. If the device driver determines that the adapter status does not require a reset, the hypervisor (100) may recover (414) the PCI Express adapter (204) from the stopped state according to the method of FIG. 4 by clearing any direct memory access freeze state in response to a request by the device driver. If the device driver determines that the adapter status requires a reset, the hypervisor (100) may recover (414) the PCI Express adapter (204) from the stopped state according to the method of FIG. 4 by performing the required reset, allowing the device driver to clear any adapter state and reinitialize the adapter, and clearing any direct memory access freeze state in response to a request by the device driver.

While the hypervisor resets the root complex and performs the hot reset of the link, the device driver may realize that the PCI Express adapter is no longer responding to the device driver. The device driver may request the status of the adapter from the hypervisor in an attempt to discover the reason that the adapter is not responding. For further explanation, therefore, FIG. 5 sets forth a flow chart illustrating an exemplary method for recovering, by the hypervisor, the PCI Express adapter from the stopped state in response to requests from a device driver operating in the logical partition for the PCI Express adapter useful in operating Peripheral Component Interconnect Express resources in a logically partitioned computing system according to embodiments of the present invention that includes receiving (500), by the hypervisor (100) from the device driver, a status request (501) for the PCI Express adapter. The status request (501) is a set of instructions issued to the hypervisor from the device driver that instruct the hypervisor to provide the current status of the PCI Express adapter. The hypervisor (100) may receive (500) a status request (501) for the PCI Express adapter from the device driver according to the method of FIG. 5 using function call of an API (reference numeral 104 of FIG. 1) provided to the device driver by the hypervisor.

Figure 5:
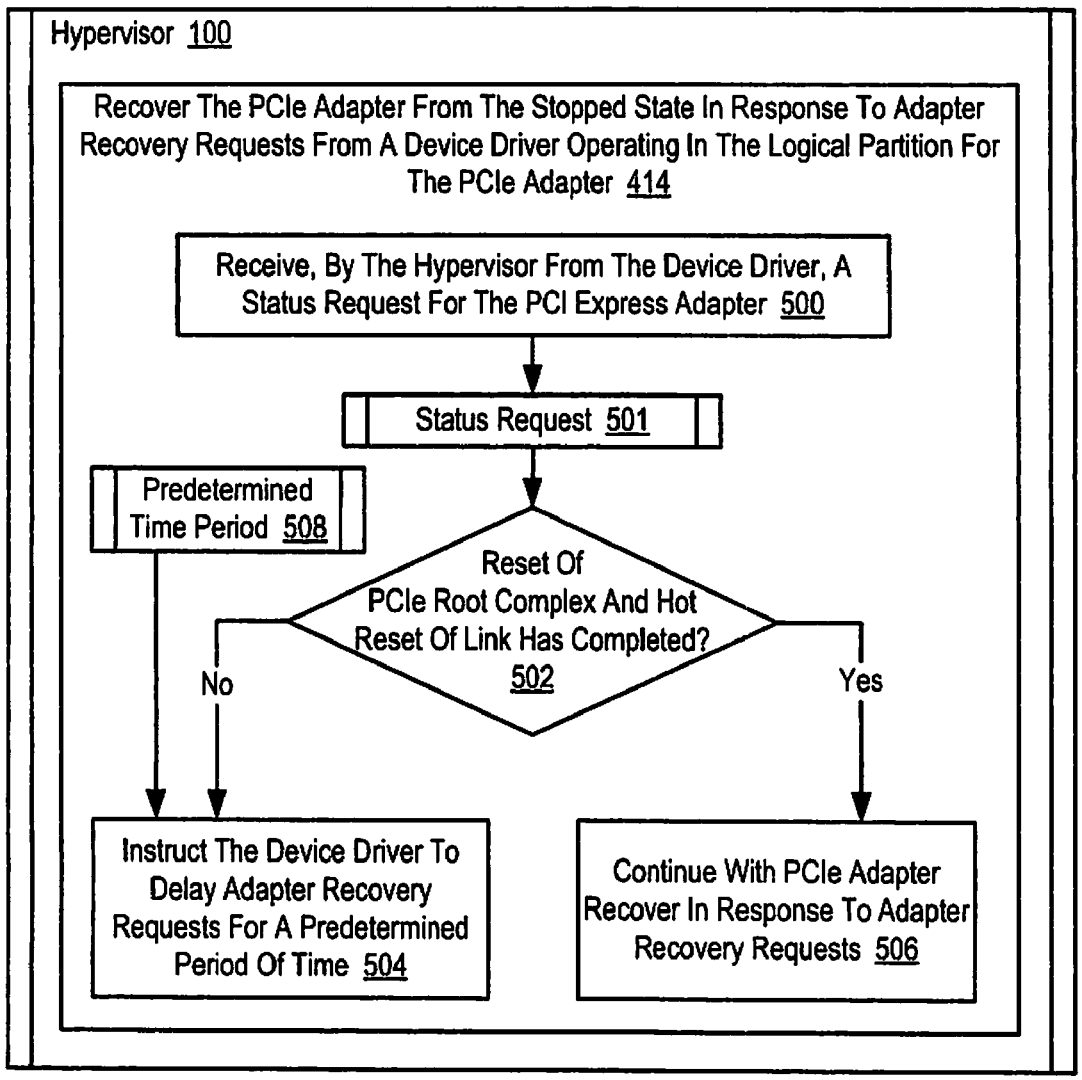
FIG. 5 sets forth a flow chart illustrating an exemplary method for recovering, by the hypervisor, the PCI Express adapter from the stopped state in response to requests from a device driver operating in the logical partition for the PCI Express adapter useful in operating Peripheral Component Interconnect Express resources in a logically partitioned computing system according to embodiments of the present invention.

The method of FIG. 5 also includes determining (502), by the hypervisor (100), whether the resetting of the PCI Express root complex and the performing of the hot reset of the link has completed. Readers will recall from above that the hypervisor maintains the current status of the root complex and the link in the data structures of the hypervisor that represent the root complex and the link respectively. The hypervisor (100), therefore, may determine whether the resetting of the PCI Express root complex and the performing of the hot reset of the link has completed according to the method of FIG. 5 by retrieving the status of the root complex and the link from the data structures of the hypervisor that represent the root complex and the link respectively. If the status of the root complex and the link in the data structures of the hypervisor that represents the root complex and the link indicates that the root complex is currently being reset and the hot reset of the link is in progress, then resetting of the PCI Express root complex and performing of the hot reset of the link has not completed. Resetting of the PCI Express root complex and performing of the hot reset of the link has completed, however, if the status of the root complex and the link in the data structures of the hypervisor that represents the root complex and the link indicates that the root complex and the link are operational.

The method of FIG. 5 includes instructing (504), by the hypervisor (100), the device driver to delay adapter recovery requests for a predetermined period of time (508) if the resetting of the PCI Express root complex and the performing of the hot reset of the link has not completed. The predetermined period of time (508) represent a time period for the device driver to wait before attempting to recover the adapter from the stopped state by issuing adapter recovery requests to the hypervisor. The predetermined period of time (508) may be a static value or dynamically calculated. For example, the predetermined period of time may be dynamically calculated to increase in duration as the resetting of the PCI Express root complex and the performing of the hot reset of the link occurs over longer periods of time. While the resetting of the PCI Express root complex and the performing of the hot reset of the link occurs, the device driver may make several status requests to the hypervisor (100). Each time the hypervisor (100) receives a status request from the device driver, the hypervisor may instruct the device driver to delay adapter recovery requests for a longer period of time to minimize the number of status requests issued by the device driver while the resetting of the PCI Express root complex and the performing of the hot reset of the link occurs. Instructing (504), by the hypervisor (100), the device driver to delay adapter recovery requests for a predetermined period of time (508) according to the method of FIG. 5 advantageously conserves system resources from being consumed by an excessive number of status requests from the device driver.

The method of FIG. 5 also includes continuing (506), by the hypervisor (100), with PCI Express adapter recovery in response to the adapter recovery requests if the resetting of the PCI Express root complex and the performing of the hot reset of the link has completed. The hypervisor (100) may continue (506) with PCI Express adapter recovery in response to the adapter recovery requests according to the method of FIG. 5 as described above for recovering the PCI Express adapter from the stopped state in response to requests from a device driver with reference to FIG. 4.

Exemplary embodiments of the present invention are described largely in the context of a fully functional computer system for operating PCI Express resources in a logically partitioned computing system. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating Peripheral Component Interconnect ('PCI') Express resources in a logically partitioned computing system, the method comprising:

allocating, by a hypervisor installed on the computing system, a PCI Express adapter installed in the computing system to a logical partition of the computing system, including establishing a data communication path between a processor of the computing system and the PCI Express adapter, the data communication path including a link between a PCI Express root complex and the PCI Express adapter; and administering, by the hypervisor for the logical partition, the PCI Express root complex and the link between the PCI Express root complex and the PCI Express adapter, further comprising;

detecting, by the hypervisor, an error in the PCI Express root complex for the PCI Express root complex, the PCI Express adapter, or the link, the error causing the PCI Express root complex to place the PCI Express adapter in a stopped state;

determining, by the hypervisor, whether the error is severe;

resetting, by the hypervisor the PCI Express root complex if the error is Severe;

clearing, by the hypervisor, the error in the PCI Express root complex if the error is not severe performing, by the hypervisor, a hot reset of the link if the error is severe, the hot reset maintaining data in sticky registers of the PCI Express adapter;

recovering, by the hypervisor, the PCI Express adapter from the stopped state in response to adapter recovery requests from a device driver operating in the logical partition for the PCI Express adapter; and suppressing, by the hypervisor, secondary link errors in the PCI Express root complex while performing the hot reset of the link, wherein the secondary link errors are errors that result from the hot reset.

2. The method of claim 1 wherein recovering, by the hypervisor, the PCI Express adapter from the stopped state in response to requests from a device driver operating in the logical partition for the PCI Express adapter further comprises:

receiving, by the hypervisor from the device driver, a status request for the PCI Express adapter;

determining, by the hypervisor, whether the resetting of the PCI Express root complex and the performing of the hot reset of the link has completed; and instructing, by the hypervisor, the device driver to delay adapter recovery requests for a predetermined period of time if the resetting of the PCI Express root complex and the performing of the hot reset of the link has not completed.

3. A logically partitioned computing system for operating Peripheral Component Interconnect ('PCI') Express resources, the system comprising a computer processor and a computer memory operatively coupled to the computer processor, the computer memory having disposed within it computer program instructions capable of:

allocating, by a hypervisor installed on the computing system, a PCI Express adapter installed in the computing system to a logical partition of the computing system, including establishing a data communication path between a processor of the computing system and the PCI Express adapter, the data communication path including a link between a PCI Express root complex and the PCI Express adapter; and administering, by the hypervisor for the logical partition, the PCI Express root complex and the link between the PCI Express root complex and the PCI Express adapter, further comprising;

detecting, by the hypervisor, an error in the PCI Express root complex for the PCI Express root complex, the PCI Express adapter, or the link, the error causing the PCI Express root complex to place the PCI Express adapter in a stopped state;

determining, by the hypervisor, whether the error is severe;

resetting, by the hypervisor, the PCI Express root complex if the error is severe;

clearing, by the hypervisor, the error in the PCI Express root complex if the error is not severe;

performing, by the hypervisor, a hot reset of the link if the error is severe, the hot reset maintaining data in sticky registers of the PCI Express adapter;

recovering, by the hypervisor, the PCI Express adapter from the stopped state in response to adapter recovery requests from a device driver operating in the logical partition for the PCI Express adapter; and suppressing, by the hypervisor, secondary link errors in the PCI Express root complex while performing the hot reset of the link, wherein the secondary link errors are errors that result from the hot reset.

4. The system of claim 3 wherein recovering, by the hypervisor, the PCI Express adapter from the stopped state in response to requests from a device driver operating in the logical partition for the PCI Express adapter further comprises:

receiving, by the hypervisor from the device driver, a status request for the PCI Express adapter;

determining, by the hypervisor, whether the resetting of the PCI Express root complex and the performing of the hot reset of the link has completed; and instructing, by the hypervisor, the device driver to delay adapter recovery requests for a predetermined period of time if the resetting of the PCI Express root complex and the performing of the hot reset of the link has not completed.

5. A computer program product for operating Peripheral Component Interconnect ('PCI') Express resources in a logically partitioned computing system, the computer program product disposed upon a recordable media for machine-readable information, the computer program product comprising computer program instructions capable of:
 allocating, by a hypervisor installed on the computing system, a PCI Express adapter installed in the computing system to a logical partition of the computing system, including establishing a data communication path between a processor of the computing system and the PCI Express adapter, the data communication path including a link between a PCI Express root complex and the PCI Express adapter; and
 administering, by the hypervisor for the logical partition, the PCI Express root complex and the link between the PCI Express root complex and the PCI Express adapter, further comprising;
  detecting, by the hypervisor, an error in the PCI Express root complex for the PCI Express root complex, the PCI Express adapter, or the link, the error causing the PCI Express root complex to place the PCI Express adapter in a stopped state;
  determining, by the hypervisor, whether the error is severe;
  resetting, by the hypervisor, the PCI Express root complex if the error is severe;
  clearing, by the hypervisor, the error in the PCI Express root complex if the error is not severe;
  performing, by the hypervisor, a hot reset of the link if the error is severe, the hot reset maintaining data in sticky registers of the PCI Express adapter;
  recovering, by the hypervisor, the PCI Express adapter from the stopped state in response to adapter recovery requests from a device driver operating in the logical Partition for the PCI Express adapter; and
  suppressing, by the hypervisor, secondary link errors in the PCI Express root complex while performing the hot reset of the link, wherein the secondary link errors are errors that result from the hot reset.

6. The computer program product of claim 5 wherein recovering, by the hypervisor, the PCI Express adapter from the stopped state in response to requests from a device driver operating in the logical partition for the PCI Express adapter further comprises:
 receiving, by the hypervisor from the device driver, a status request for the PCI Express adapter;
 determining, by the hypervisor, whether the resetting of the PCI Express root complex and the performing of the hot reset of the link has completed; and
 instructing, by the hypervisor, the device driver to delay adapter recovery requests for a predetermined period of time if the resetting of the PCI Express root complex and the performing of the hot reset of the link has not completed.

* * * * *